United States Patent
Baldwin et al.

(10) Patent No.: US 11,646,523 B1
(45) Date of Patent: *May 9, 2023

(54) POWERED WALL PLATE WITH KEYED INTERFACE

(71) Applicants: Jeffrey P. Baldwin, Anthem, AZ (US); John E. Klein, Chandler, AZ (US)

(72) Inventors: Jeffrey P. Baldwin, Anthem, AZ (US); John E. Klein, Chandler, AZ (US)

(73) Assignee: TITAN3 TECHNOLOGY LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,572

(22) Filed: Oct. 28, 2022

Related U.S. Application Data

(63) Continuation of application No. 16/891,060, filed on Jun. 3, 2020, now Pat. No. 11,489,280.

(60) Provisional application No. 62/857,233, filed on Jun. 4, 2019.

(51) Int. Cl.
 *H01R 13/447* (2006.01)
 *H01R 13/645* (2006.01)
 *H01R 24/76* (2011.01)

(52) U.S. Cl.
 CPC ....... *H01R 13/447* (2013.01); *H01R 13/6456* (2013.01); *H01R 24/76* (2013.01)

(58) Field of Classification Search
 CPC .. H01R 13/447; H01R 13/6456; H01R 24/76; H01R 25/006; H01R 13/717; H01R 13/512; H01H 23/04; H01H 23/025; H02G 3/14
 See application file for complete search history.

(56) References Cited

U.S. PATENT DOCUMENTS

| | | |
|---|---|---|
| 3,522,595 A | 8/1970 | White |
| 4,514,789 A | 4/1985 | Jester |
| 4,536,694 A | 8/1985 | McCarty |
| 4,835,343 A | 5/1989 | Graef |
| 6,026,605 A | 2/2000 | Tippett |
| 6,051,788 A | 4/2000 | Nichols |
| 6,297,450 B1 | 10/2001 | Yu |
| 6,423,900 B1 | 7/2002 | Soules |

(Continued)

FOREIGN PATENT DOCUMENTS

JP  2019056906 A  4/2019

*Primary Examiner* — Tho D Ta
(74) *Attorney, Agent, or Firm* — Booth Udall Fuller, PLC; Kenneth C. Booth

(57) ABSTRACT

A powered wall plate may include a face plate comprising an opening extending through the face plate from the first surface to the rear surface. A first keyed interface may be formed at the rear surface of the face plate. An electrical receptacle may comprise a second keyed interface configured to be coupled with the first keyed interface, the electrical receptacle further comprising terminals disposed on sides of the electrical receptacle. Spring-biased terminals may be coupled to the face plate and coupled with the terminals. A powered feature may be coupled to the face plate and configured to be electrically coupled to the electrical receptacle through the spring-biased terminals when the first keyed interface and the second keyed interface are mateably coupled. Power may not be supplied from the electrical receptacle to the powered feature when the first keyed interface is not mateably coupled with the second keyed interface.

20 Claims, 13 Drawing Sheets

(56) References Cited

U.S. PATENT DOCUMENTS

| | | |
|---|---|---|
| 6,923,663 B2 | 8/2005 | Oddsen |
| 6,977,341 B1 | 12/2005 | Gustaveson, II |
| 6,981,896 B2 | 1/2006 | Su |
| 6,993,417 B2 | 1/2006 | Osann, Jr. |
| 7,140,922 B2 | 11/2006 | Luu |
| 7,247,793 B2 | 7/2007 | Hinkson |
| 7,271,339 B2 | 9/2007 | Dinh |
| 7,833,037 B2 | 11/2010 | Reusche |
| 7,896,702 B2 | 3/2011 | Stiehl |
| 8,668,347 B2 | 3/2014 | Ebeling |
| 8,668,647 B2 | 3/2014 | Eskandari |
| 8,834,210 B2 | 9/2014 | Brausen |
| 8,864,517 B2 | 10/2014 | Cohen |
| 8,912,442 B2 | 12/2014 | Smith |
| 8,951,053 B2 | 2/2015 | Ho |
| 9,329,607 B2 | 5/2016 | Kevelos |
| 9,362,728 B2 | 6/2016 | Smith |
| D781,241 S | 3/2017 | Knight |
| 9,732,921 B2 | 8/2017 | Chien |
| 9,825,414 B2 | 11/2017 | Armstrong |
| 9,882,313 B2 | 1/2018 | Steinbuchel, IV |
| 9,997,860 B1 * | 6/2018 | Hernandez, Jr. ..... H01R 25/006 |
| 10,161,806 B2 | 12/2018 | Lermann |
| 10,276,979 B2 | 4/2019 | Cyzen |
| 10,505,326 B2 | 12/2019 | Chien |
| 10,720,727 B1 | 7/2020 | Shotey |
| 10,903,636 B1 | 1/2021 | Baldwin |
| 10,985,516 B1 | 4/2021 | Gartside |
| 11,011,867 B1 | 5/2021 | Shotey |
| 11,277,587 B1 | 3/2022 | Baldwin |
| 11,489,280 B1 * | 11/2022 | Baldwin ................ H01R 24/76 |
| 11,489,323 B1 | 11/2022 | Baldwin |
| 2004/0142601 A1 | 7/2004 | Luu |
| 2012/0068612 A1 | 3/2012 | Ebeling |
| 2014/0375532 A1 | 12/2014 | Chien |
| 2015/0340826 A1 | 11/2015 | Chien |
| 2018/0188779 A1 | 7/2018 | Allen |
| 2018/0193545 A1 | 7/2018 | Crnkovich |
| 2018/0241146 A1 | 8/2018 | Smith |
| 2018/0301882 A1 | 10/2018 | Smith |
| 2020/0412070 A1 | 12/2020 | Owen |
| 2021/0098949 A1 | 4/2021 | Diotte |

\* cited by examiner

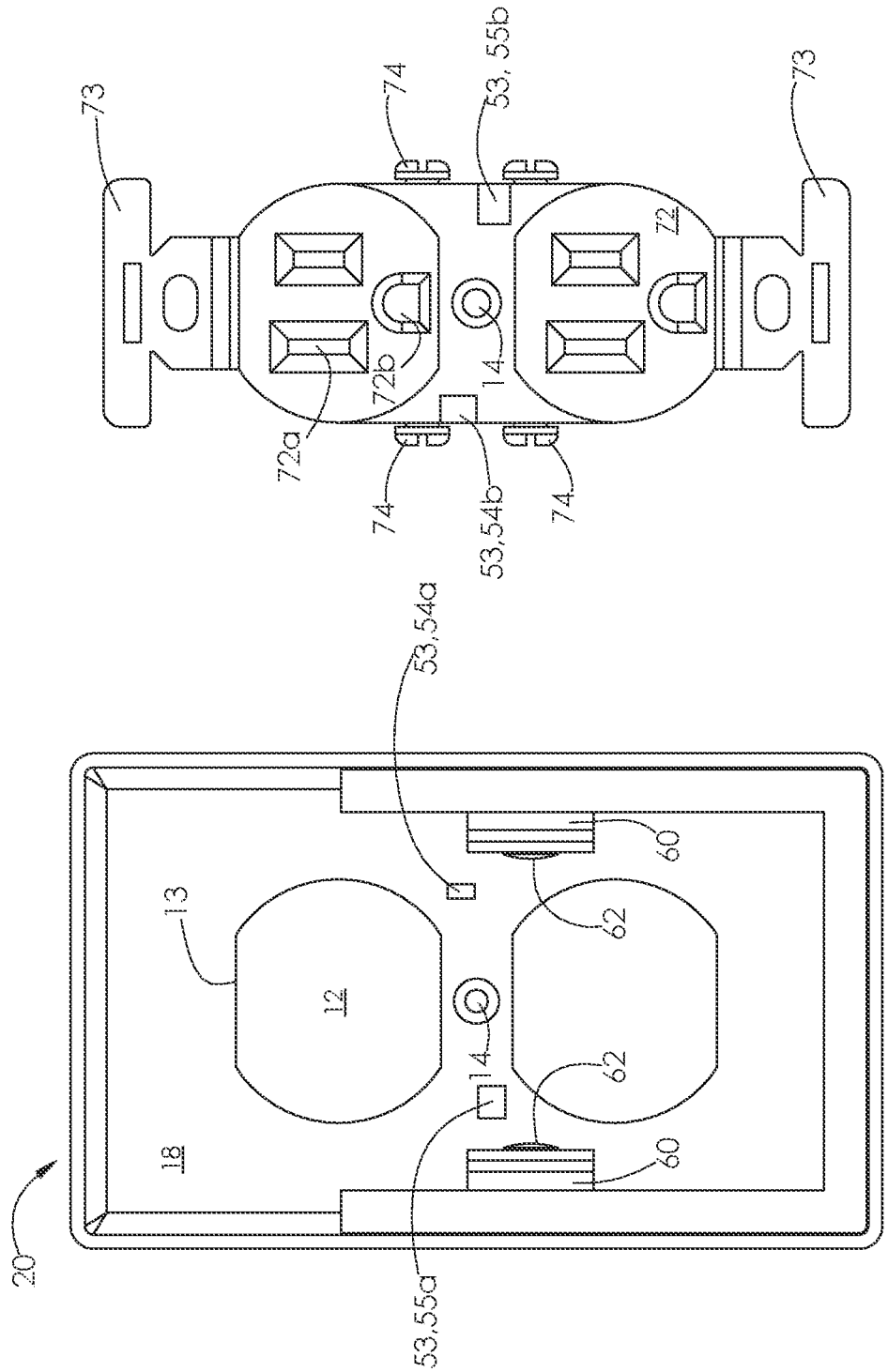

POWERED WALL PLATE WITH KEYED INTERFACE

CROSS REFERENCE TO RELATED APPLICATIONS

This application is a continuation of U.S. utility application Ser. No. 16/891,060 to Jeffrey P. Baldwin et al. titled "Powered Wall Plate with Keyed Interface," filed Jun. 3, 2020, which application claims the benefit, including the filing date, of U.S. provisional patent application No. 62/857,233 to Jeffrey P. Baldwin et al. titled "Powered Wall Plate with Keyed Interface," filed Jun. 4, 2019, the entirety of the disclosures of which are incorporated herein by this reference.

TECHNICAL FIELD

This application relates to the field of electrical receptacles and powered wall plates or powered wall covers.

BACKGROUND

Wall plates are well known and are used to separate—occupy a space between—an electrical box/electrical receptacle and an electrical device or plug coupled to the electrical receptacle. Specifically, wall plates are known to provide a more aesthetically pleasing appearance while also preventing access to electrical receptacles. By preventing access to the electrical receptacle, the user is safer because electrical wiring is not readily accessible.

Wall plates are also known to provide a simple lighting source or powering of portable devices, such as through USB connections, but are commonly unsafe and may rely on direct, spring-biased connections with an installed electrical receptacle. Spring-biased electrical connections may be unsafe due to inherent unreliability of the spring-biased connections which may short or become damaged over time, leading to electrical and/or fire hazards.

SUMMARY

According to aspects of the disclosure, a powered wall plate may comprise a face plate comprising a front surface and a rear surface opposite the front surface with an opening extending through the face plate from the first surface to the rear surface. A first keyed interface may be formed on the rear surface of the face plate. An electrical receptacle may comprise a second keyed interface configured to be coupled with the first keyed interface, the electrical receptacle further comprising terminal screws disposed on opposing sides of the electrical receptacle, the electrical receptacle being accessible through the opening. Spring-biased terminals may be coupled to the rear surface of the face plate and disposed at opposing sides of the opening. The spring-biased terminals may be coupled with the terminal screws. A printed circuit board (PCB) may be coupled to the face plate and the spring-biased terminals. A powered feature may be coupled to the face plate and the PCB. The powered feature may be configured to be electrically coupled to, receive electrical power from, and form a protective circuit with, the electrical receptacle through the spring-biased terminals when the first keyed interface and the second keyed interface are mateably coupled. Power may not be supplied from the electrical receptacle to the powered feature through the spring-biased terminals when the first keyed interface is not mateably coupled with the second keyed interface and the protective circuit is open.

Particular embodiments may comprise the first keyed interface and the second keyed interface are mechanically and electrically coupled to each other to provide a desired connection between the first and second spring-biased terminals and the first and second to terminal screws, respectively. One of the first keyed interface and the second keyed interface may be a boss and the other of the first keyed interface and the second keyed interface may be a switch. One of the first keyed interface and the second keyed interface may be a magnet and the other of the first keyed interface and the second keyed interface may be a switch. The first keyed interface and the second keyed interface may comprise a tab and a recess that together form a first keyed pair, and the powered wall plate may further comprise a second keyed pair comprising a tab and a recess, the second keyed pair comprising a structure different from a structure of the first keyed pair such that the first keyed pair and the second keyed pair are not compatible to be mateably coupled with each other. The powered feature may comprise at least one of: a USB port, a night light, a camera, or a carbon monoxide detector or smoke alarm. An indicator light may be coupled to the circuit board and visible at a surface of the face plate, the indicator light may be configured to be illuminated when the first keyed interface and the second keyed interface are not mateably coupled to indicate to a user that the spring-biased terminals are improperly coupled to the terminal screws.

According to an aspect of the disclosure, a powered wall plate may comprise a face plate comprising an opening extending through the face plate from the first surface to the rear surface. A first keyed interface may be formed at the rear surface of the face plate. An electrical receptacle comprising a second keyed interface may be configured to be coupled with the first keyed interface. The electrical receptacle may further comprise terminals disposed on sides of the electrical receptacle. Spring-biased terminals may be coupled to the face plate and coupled with the terminals. A powered feature may be coupled to the face plate and configured to be electrically coupled to the electrical receptacle through the spring-biased terminals when the first keyed interface and the second keyed interface are mateably coupled. Power may not be supplied from the electrical receptacle to the powered feature when the first keyed interface is not mateably coupled with the second keyed interface.

Particular embodiments may comprise the first keyed interface and the second keyed being mechanically coupled, electrically coupled, or both, to each other to provide power to the powered device. One of the first keyed interface and the second keyed interface may be a boss or a magnet and the other of the first keyed interface and the second keyed interface may be a switch. The first keyed interface and the second keyed interface may comprise a tab and a recess that together form a first keyed pair. The powered wall plate may further comprise a second keyed pair comprising a tab and a recess, the second keyed pair comprising a structure different from a structure of the first keyed pair such that the first keyed pair and the second keyed pair are not compatible to be mateably coupled with each other. The powered feature may comprise at least one of: a USB port, a night light, a camera, or a carbon monoxide detector or smoke alarm. An indicator may be visible at a surface of the face plate, the indicator configured to indicate to a user when the first keyed interface and the second keyed interface are not mateably coupled and the spring-biased terminals are improperly coupled to the terminals.

According to an aspect of the disclosure, a powered wall plate may comprise a face plate comprising an opening, and a first keyed interface. An electrical receptacle may comprise a second keyed interface configured to be coupled with the first keyed interface, the electrical receptacle further comprising terminals. Spring-biased terminals may be coupled to the face plate and the terminals. A powered feature may be coupled to the face plate and electrically coupled to the spring-biased terminals when the first keyed interface and the second keyed interface are mateably coupled. Power may not be supplied from the electrical receptacle to the powered feature when the first keyed interface is not mateably coupled with the second keyed interface.

Particular embodiments may comprise the first keyed interface and the second keyed being mechanically coupled, electrically coupled, or both, to each other to provide power from the receptacle to the powered device. One of the first keyed interface and the second keyed interface may be a boss or a magnet and the other of the first keyed interface and the second keyed interface may be a switch. The first keyed interface and the second keyed interface may comprise a tab and a recess that together form a first keyed pair. The powered wall plate may further comprise a second keyed pair comprising a tab and a recess, the second keyed pair comprising a structure different from a structure of the first keyed pair such that the first keyed pair and the second keyed pair are not compatible. The powered feature may comprise at least one of: a USB port, a night light, a camera, or a carbon monoxide detector or smoke alarm. An indicator may be visible at a surface of the face plate, the indicator being configured to indicate to a user when the first keyed interface and the second keyed interface are not mateably coupled and the spring-biased terminals are improperly coupled to the terminals. The first keyed interface may be formed at the rear surface of the face plate.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . "or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and:

FIG. 11 illustrates a rear profile view of the face plate from the powered wall plate of FIG. 9;

FIG. 12 illustrates a front profile view of the receptacle from the powered wall plate of FIG. 9;

DETAILED DESCRIPTION

Figure 4:
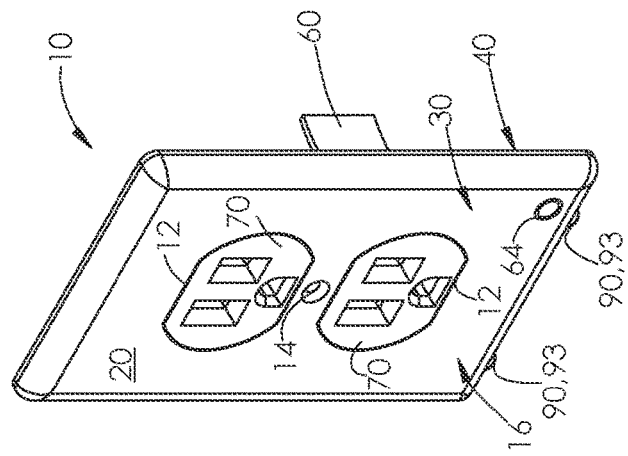
FIG. 4 illustrates a front/side perspective view of the wall plate of FIG. 1.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

The present disclosure concerns a wall plate, a keyed wall plate, powered wall plate, or safety wall plate 10. A person of ordinary skill in the art will recognize that the wall plate 10 further comprises, and may be referred to as, a face plate, cover, or duplex receptacle wall plate 10. A variety of different implementations of the wall plate 10 are discussed below. It should be understood that the components depicted and discussed are non-limiting examples, and that the contemplated components may be combined with any of the other components in other implementations.

The powered wall plate 10 may comprise at least one face plate or housing 20 coupled with, or configured to be coupled with, an electrical receptacle 70. The electrical receptacle 70 may comprise an electrical receptacle or a duplex receptacle (as shown, e.g., in FIGS. 1-8 and 9-28), as well as a light switch (as shown, e.g., in FIG. 29C). The receptacle 70, when formed as an electrical outlet or socket with openings to receive the prongs or tines of an electrical plug may comprise openings for plug blades 72a and openings for ground 72b. The receptacle 70 may also include a face 72 of the receptacle 70 as well as terminal screws or terminals 74 for providing electrical interconnect or power to items wired to the terminal 74, including wire disposed or housed at least partially within an electrical box 80. The electrical receptacle 70 may be disposed or held within the electrical box 80. One or more threaded fasteners or screws 82 may couple or releasable fasten the wall plate 10 to the receptacle 70, with the fastener 82 further extending into, or coupling with, a box mounting screw aperture of the electrical outlet box 80. The placement of the screw hole 14 may vary to conform with the different desired configurations of the powered wall plate 10 and different configurations of the receptacle 70. For example, in one implementation, the wall plate attachment may be configured to attach to a decorator or ground-fault circuit interrupter (GFCI) device. In another implementation, the wall plate attachment 14, 82 may be configured to attach to a duplex device and wall plate, with the attachment screw 82 extending through a center screw of the duplex device.

The powered wall plate 10 comprises at least one face plate or housing 20 that may be formed of a single or unitary member, and in other instances may comprise more than one discrete member, such as a front face plate 30 and a rear face plate 40. A printed circuit board (PCB), circuit board, or electrical substrate 50 may be disposed between the front face plate 30 and a rear face plate 40 in a sandwich configuration, when desirable. In other instances, the PCB 50 may be disposed behind the face plate 20 or at a back surface 18 of the face plate 20. One or more openings, switch openings, or receptacle openings 12 may be formed though the wall plate or face plate 20. The electrical receptacle 70, or a portion thereof—such as a face 72 of the receptacle 70—may be exposed, accessed, or seen through the opening 12 in the face plate 20. The receptacle openings 12 include an edge or perimeter 13. The wall plate 20 also comprises a front surface or first surface 16 and a rear surface or second surface 18 opposite the front surface 16 with the opening 12 extending through the face plate 20 from the first surface 16 to the rear surface 18. The face plate 20 further comprises one or more screw openings or threaded fastener openings 14.

The powered wall plate 10 distinguishes itself from a conventional or non-powered wall plate by including one or more powered features or electrical elements 90, and by comprising one or more keyed features 53. Powered features 90 may include one or more features or devices, such as USB ports 92, night lights or light emitting diodes (LEDs) 93, cameras 94, carbon monoxide detectors or smoke alarms 95, or other desirable features, as shown for example, in FIGS. 1-8 and 29A-29C. While various combinations of powered features 90 are shown included or arranged in various configurations, any desired arrangement or configuration of any number of powered features 90 may be included as part of any particular powered wall plate 10.

Functionality of the powered features 90 may be supported by, and interconnected with PCB 50, which may be further coupled to, or in communication with, one or more of a transmitter, an integrated memory storage device, an external memory storage port, external memory port, or memory storage, or a removable external memory storage device, such as an external memory card or SD card. The PCB 50 may further support and be interconnected with circuitry protection 52, such as an Arc Fault Circuit Interrupter (AFCI), or a thermal protection circuitry, module, circuit, or device.

The powered features 90 of the powered wall plate 10 can be powered by, or receive electrical power from—whether directly or indirectly—spring-biased terminals 60. Examples of powered wall plates 10 incorporating spring-biased terminals 20 are illustrated, e.g., in FIGS. 1-29c. The spring-biased terminals 60 allow the powered wall plate 10 to be powered by the electrical receptacle 70, such as by contacting the terminal screws 74 of the outlet or receptacle 70. The spring-biased terminals 60 may be formed with, or comprising, a flexible or deformable conductive material, such as of a thin strip of metal that is friction fit or press fit with the terminal screws 74. By having the spring-biased terminals 60, and more particularly a contact or electrical contact 62 on the spring-biased terminals 60 contact an outer surface of the terminal screws 74, a quick and easy installation of the powered wall plate 10 can be achieved without loosening the terminal screws, wrapping a wire around the terminal screws between the screw head and the body of the receptacle 70, and then tightening the terminal screw. The flexibility of the spring-biased terminals 60 allows the spring-biased terminals 60 to extend from the rear surface 18 of the powered wall plate 10 to either side of the receptacle 70 and for the spring-biased terminals 60, the contacts 62, or both, to contact the terminal screws 74. Accordingly, the spring-biased terminals 60 can easily slide onto terminal screws 74 to securely and efficiently transfer electrical current from the receptacle 70 to the powered feature 90, such as by providing electrical current to the circuit board 50 to activate the powered features 90.

Figure 1:
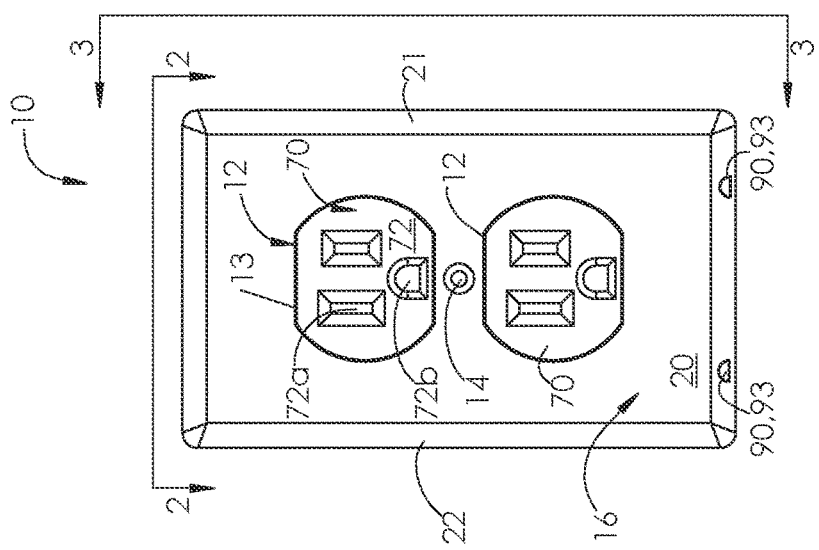
FIG. 1 illustrates a front profile view of a powered wall plate comprising a keyed interface.
Figure 8:
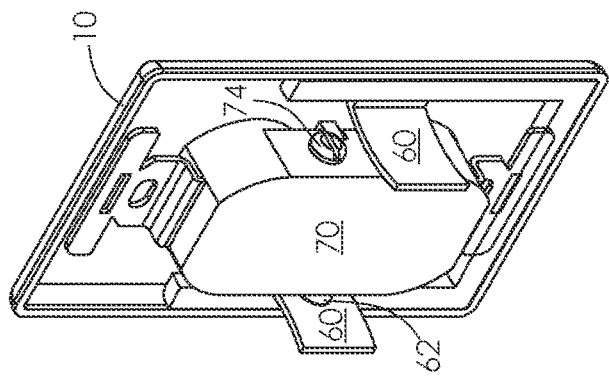
FIG. 8 illustrates a back/side perspective view of the wall plate of FIG. 1.

FIGS. 1-8 show various views of the wall plate 10, and conventional coupling of a face plate 20 to a receptacle 70 with spring-biased terminal and without keying 53, as shown and discussed later with respect to the FIGs subsequent to FIG. 8. FIG. 1 shows a front profile view of the powered wall plate 10 coupled to the electrical receptacle 70 with the openings 72, 72a of the electrical receptacle 70 exposed by openings 12 in the wall plate 10 for receiving the prongs or tines of electrical plugs. The view of FIG. 1 presents the wall plate 10 and the receptacle 70 as would be seen from an open space or by a passerby. For convenience, and not by way of limitation, directional references to the wall plate 10, such as a right side 21 or left side 22 of the powered wall plate 10 and the face plate 20 are made with respect to an observer facing the wall plate and the wall to which it would be mounted.

The wall plate 10 comprises a front surface or first surface 16 oriented away from a wall and oriented towards an open space or passerby. The wall plate 10 also comprises a rear surface or second surface 18 oriented towards a wall and oriented away from an open space or passerby. The wall plate 10 may be formed of rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials, plastics and/or other like materials; composites and/or other like materials, metals, such as zinc, magnesium, titanium, copper, iron, steel, carbon steel, alloy steel, tool steel, stainless steel, spring steel, aluminum, and/or other like materials, ceramic, stone, wood, cellulose, or other natural material, and/or any combination or composite of the foregoing.

The face plate 20 may comprise be made by, with, or involve 3-D printing, extrusion, pultrusion, vacuum forming, injection molding, blow molding, resin transfer molding, casting, forging, cold rolling, milling, drilling, reaming, turning, grinding, stamping, cutting, carving, bending, welding, soldering, hardening, riveting, punching, plating, and/or the like. The wall plate 20 may be a standard off the shelf wall plate, as well as a custom plate, the additional structures, functions, and features of the powered wall plate 10 comprising the face plate 20 being compatible with both.

Figure 2:
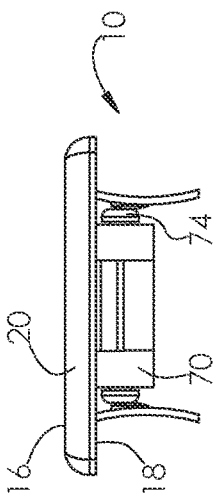
FIG. 2 illustrates a top plan view of the wall plate of FIG. 1.

FIG. 2 shows a top or plan view of the power wall plate 10 taken along the section line 2 shown in FIG. 1. The power wall plate 10 is shown with the face plate 20 coupled to the electrical receptacle 70 with the spring-biased terminals 60 of the power wall plate 10 coupled to the screws or terminals 72b of the receptacle 70. The view of FIG. 2 is perpendicular or orthogonal to the view shown in FIG. 1.

Figure 3:
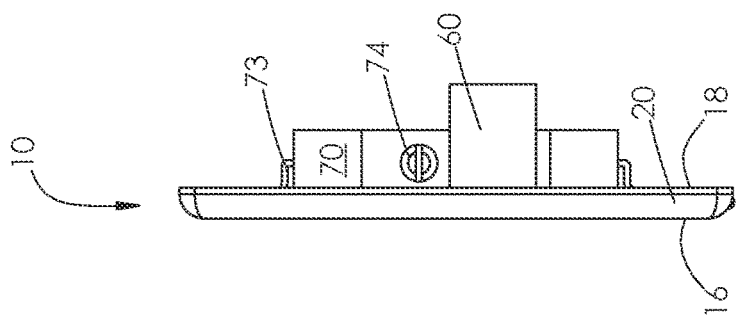
FIG. 3 illustrates a right-side profile view of the wall plate of FIG. 1.

FIG. 3 shows a right side profile view of the power wall plate 10, as taken along the section line 3 in FIG. 1. The power wall plate 10 is further shown coupled to the electrical receptacle 70 shown in a view orthogonal or perpendicular to that shown in FIGS. 1 and 2. The view of FIG. 3 presents the wall plate 10 with the face plate 20 and the receptacle 70 arranged as would be seen if the wall to which they were mounted did not obscure a view of the receptacle 70 when it was disposed within the wall.

FIG. 4 shows a front perspective view of the power wall plate 10 comprising the wall plate 20 coupled with the electrical receptacle 70 similar to the views shown in FIGS. 1-3.

Figure 5:
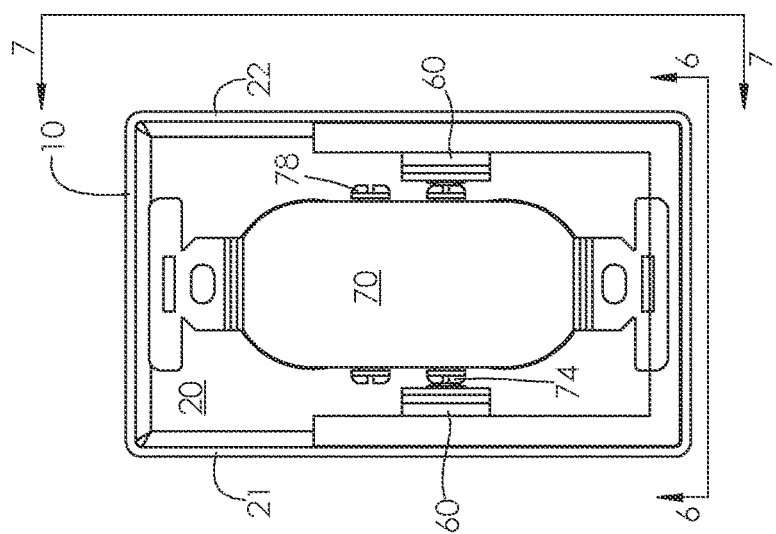
FIG. 5 illustrates a back profile view of the wall plate of FIG. 1.

FIG. 5 shows a back profile view of the power wall plate 10, with the face plate 20 coupled to the electrical receptacle 70 with the screws or terminals 74 of the electrical receptacle 70 in contact with the spring-biased terminals 60 of the power wall plate 10.

Figure 6:
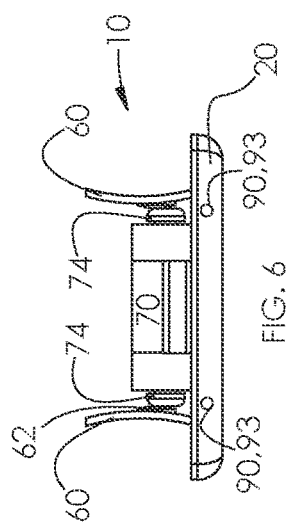
FIG. 6 illustrates a bottom plan view of the wall plate of FIG. 1.

FIG. 6 shows a bottom or plan view of the power wall plate 10, as taken along the section line 6 shown in FIG. 5. The power wall plate 10 is shown with the wall plate 20 coupled to the electrical receptacle 70 with the spring-biased terminals 60 of the power wall plate 10 coupled to the screws or terminals 74 of the receptacle 74.

Figure 7:
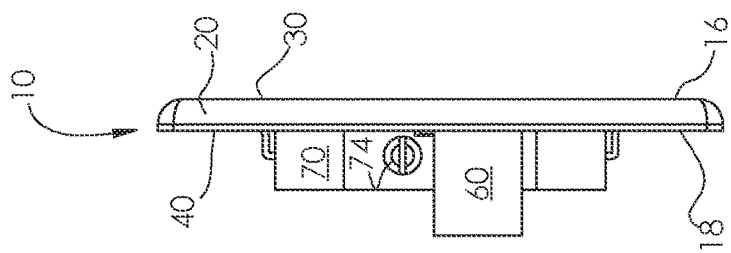
FIG. 7 illustrates a left-side profile view of the wall plate of FIG. 1.

FIG. 7 shows a left side profile view of the power wall plate 10 as taken along the section line 7 shown in FIG. 5. The power wall plate 10 is shown with the face plate 20 coupled to the electrical receptacle 70 shown in a view orthogonal or perpendicular to that shown in FIG. 5, and opposite the view shown in FIG. 3.

FIG. 8 shows a rear perspective view of the power wall plate 10 with the face plate 20 coupled to the electrical receptacle 70 with spring-biased terminals 60. When the power wall plate 10 is arranged with the wall plate 20 coupled to the electrical receptacle 70 without keying or keyed features 53, the quality of the connection between the spring-biased terminals 60 and the outlet terminal screws 74 may vary, be unpredictable, and provide low quality or inferior connections. The unpredictable contact between the power face plate 20 and the electrical receptacle 70 may result from a number of factors, which are not standardized in the electrical industry. Non-standardized factors include: (i) the spatial or physical location as measured in X, Y, and Z directions, of the terminal screws 74 of the outlet or receptacle 70, (ii) head geometry of the terminal screws 74, (iii) coating or platings on the terminal screws 74, (iv) and a width of the electrical box or junction box 80 in which the receptacle 70 is placed, and over which the face wall plate 20 is disposed; more specifically, some spring-biased terminals 60 may contact and be repositioned, displaced, or deflected by sides of the junction box 80 to apply increased contact pressure to the screws 74. Other installation issues that may also affect the quality of the connection between the screws 74 of the electrical receptacle or outlet 70 and the spring-biased terminals 60 are: (i) the number of wires trapped under the heads of terminal screws 74, (ii) the number of wires stuffed into the electrical box 80, and (iii) the position of the electrical receptacle 70 relative to the wall or wall surface (for example, the face 72 of the electrical receptacle 70 could be offset from, or out too far with respect to, a surface of the wall. Similarly, the face 72 of the electrical receptacle 70 could be offset from, or in too far with respect to, a surface of the wall. Additionally, the face 72 of the electrical receptacle 70 could be twisted with respect to one or more of the wall, the floor, or the electrical box 80.

The current design, innovation, and improvement allows for, creates, or facilitates protection against one or more of poor electrical connections, short circuiting, arc faults, or overheating associated with installing a powered wall plate 10 or face plate 20 that incorporates spring-biased terminals 60 coupled to an electrical receptacle 70. More specifically, when the connection between the spring-biased terminals 60 are sub-optimally coupled to the terminals or terminal screws 74 of the electrical receptacle 70 for any of the reasons outlined above, or for similar reasons, additional protection can be provided by keying or keyed features 53, the circuitry protection 52, or both.

FIGS. 9-12 show an example of the keying 53 in which a good connection between the wall plate 20 and the electrical receptacle 70 may be provided by incorporating keying features 53, that may be mechanical, electrical, magnetic, or other suitable feature. The keying features 53 function between compatible face plates 20 and electrical receptacles 70 to provide a good connection or coupling between the face plate 20 and the electrical receptacle 70.

Adding protective keying 53, protective circuitries 52, or both, to the powered wall plates 10 incorporating spring-biased terminals 60 makes the powered wall plates 10 safer be providing controls and warnings to users when non-standard or variables in connections introduce undesired safety risks. With notice or a warning, such as by an indicator, alarm, or any other signal 64, either at the face plate 20 or transmitted to another electronic device, such as a home alarm system, email account, smart watch, mobile phone, or other device, will allow for the user to receive and be provided with immediate feedback after installation and through its life cycle of the powered wall plate 10 that there is a safe connection, or that a concern is present.

Figure 9:
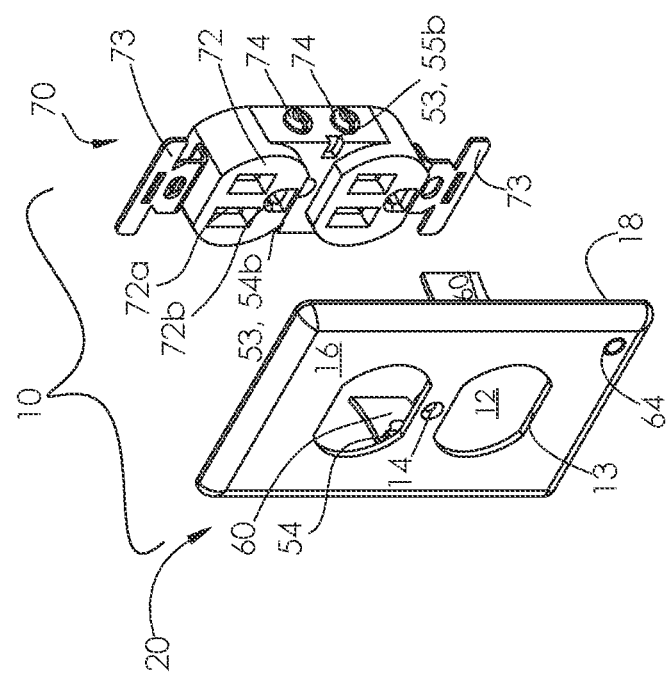
FIG. 9 illustrates a front perspective view of a powered wall plate comprising a keyed interface.

FIG. 9 shows an exploded front perspective view of the power wall plate 10 comprising the wall plate 20 coupled with the electrical receptacle 70. The front surface of the receptacle 70 is shown comprising a second keyed interface 54b and a fourth keyed interface 55b, each formed near a midsection of the receptacle 70, spaced vertically between the upper face 72 of receptacle 70 and the lower face 72 of receptacle 70. The second keyed interface 54b and the fourth keyed interface 55b are also horizontally offset from the fastener opening at the center of the receptacle 70. Both the second keyed interface 55b and the fourth keyed interface 55b are shown formed as openings, indentations, recesses, or hallows extending in a direction perpendicular to, and into, the front face of the receptacle towards the back surface of the receptacle 70. The second keyed interface 54b and the fourth keyed interface 55b may be advantageously formed of different shapes, such as one or more of a cube, rectangular prism, cylinder, or other geometric or organic three-dimensional form. The second keyed interface 54b and the fourth keyed interface 55b may also be of different sizes, and asymmetrically positioned away from a central vertical axis and along or way from a central horizontal axis. The second keyed interface 54b and the fourth keyed interface 55b may also be asymmetrically positioned about the centroid of the wall plate 20, so that upon rotating the wall plate 20, e.g. positioning it upside down over the receptacle 70, the second keyed interface 54b and the fourth keyed interface 55b may only compatible with, and mateably couple with, their corresponding first keyed interface 54a and third keyed interface 55a.

As such, FIG. 9 shows an instance in which the wall plate 20 may be formed with keying 53 formed as protrusion 54a and 55a that are compatible with the keyed receptacle 70. As shown in FIG. 9, the keyed receptacle 70 comprises openings 54b and 55b that are designed, arranged, or configured to receive and mateably couple with the protrusions 54a and 55a from the rear surface 18 of the face plate 20. In other instances, the reverse may be true, and the receptacle 70 may comprise keying 53 formed as openings, indentations, recesses, or hallows 54b and 55b.

Thus, a person of ordinary skill in the art (POSA) will appreciate that protrusion/recess configurations of keying elements 53 may be reversed or interchanged. In some instances, keying elements 53 may also include both protrusions and recess on each of the opposing or mateable surfaces of wall plate 20 and receptacle 70, rather than just one type of protrusion or recess formed on each of the opposing or mateable surfaces of wall plate 20 and receptacle 70. For example, the wall plate 20 (such as the rear surface 18 of the wall plate 20) could comprise one or more keyed features 53 formed as a recess and one or more keyed features 53 formed as a protrusion. Similarly, the receptacle 70 (such as the front surface of the receptacle 70) could comprise one or more keyed features 53 formed as a recess and one or more keyed features 53 formed as a protrusion. As shown in the figures, one or more keyed features 53, such as second keyed interface 54b may be formed at, through, in, or along, more than one face, edge, or surfaces, such as at both a front face and a side face of the receptacle 70.

Figure 28:
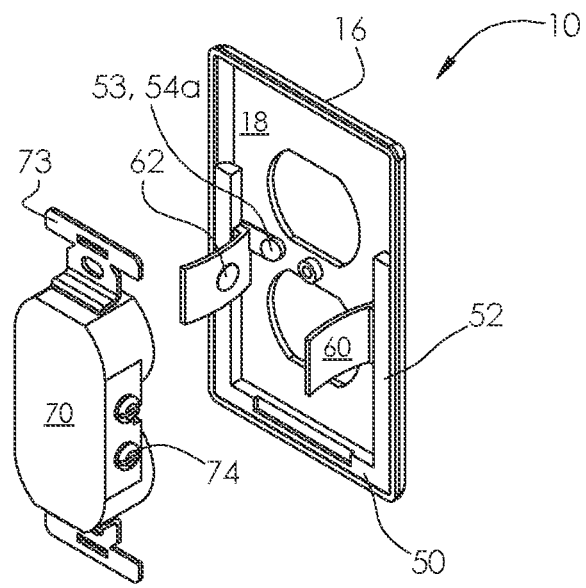
FIG. 28 illustrates a rear perspective view of the powered wall plate 10 from FIG. 27.
Figure 29A:
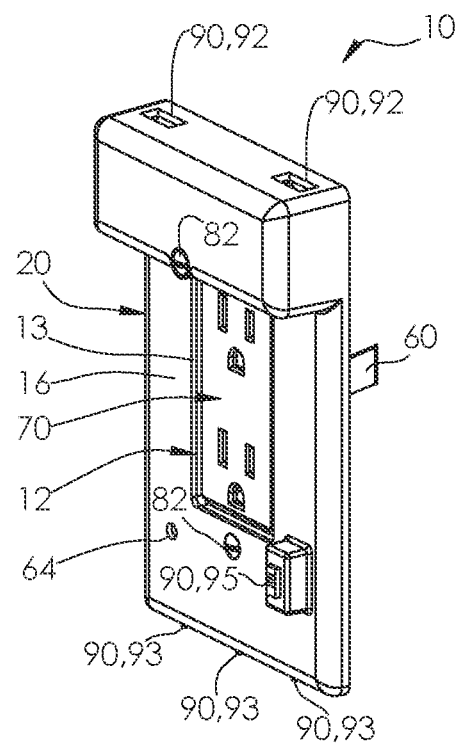
FIGS. 29A-29C illustrate various powered wall plates comprising powered features.
Figure 29B:
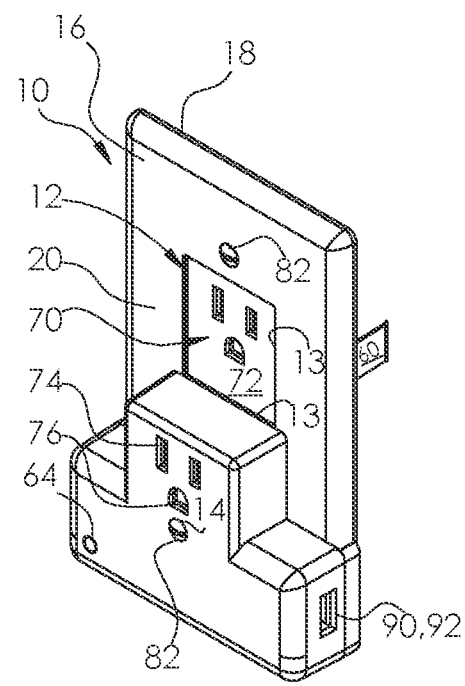
Figure 29C:
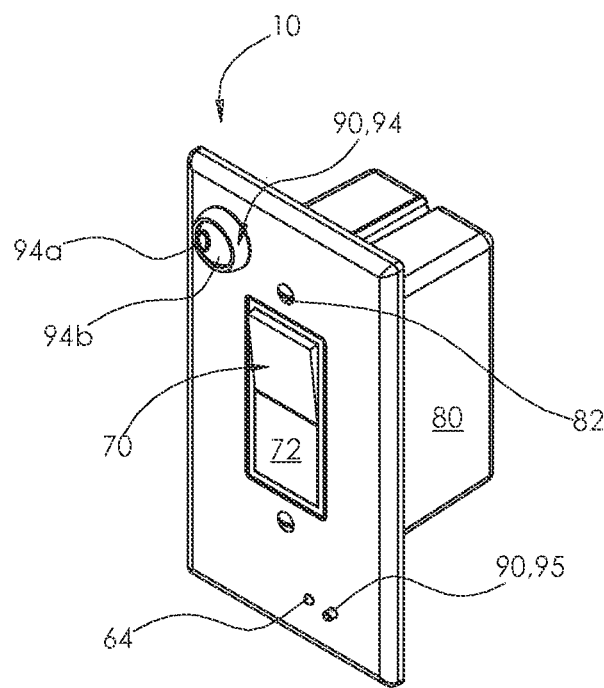

A POSA will also appreciate that one or more keyed pairs, including a first keyed pair 54c (comprising first keyed interface 54a and second keyed interface 54b), a second keyed pair 55c (comprising third keyed interface 55a and a fourth keyed interface 55b) may be configured to be coupled to, or with, an electrical receptacle 70, such as an electrical receptacle or a duplex receptacle (as shown, e.g., in FIGS. 9-28), as well as a light switch (as shown, e.g., in FIG. 29C). The receptacle 70, when formed as an electrical outlet or socket with openings to receive the prongs or tines of an electrical plug, may comprise openings for plug blades 72a and openings for ground 72b. The receptacle 70 may also include a face 72 of the receptacle 70 as well as terminal screws or terminals 74 for providing electrical interconnect or power to items wired to the terminal 74, including wire disposed or housed at least partially within an electrical box 80. The electrical receptacle 70 may be disposed or held within the electrical box 80. One or more threaded fasteners or screws 82 may couple or releasable fasten the wall plate 10 to the receptacle 70, with the fastener 82 further extending into, or coupling with, a box mounting screw aperture of the electrical outlet box 80.

Figure 10:
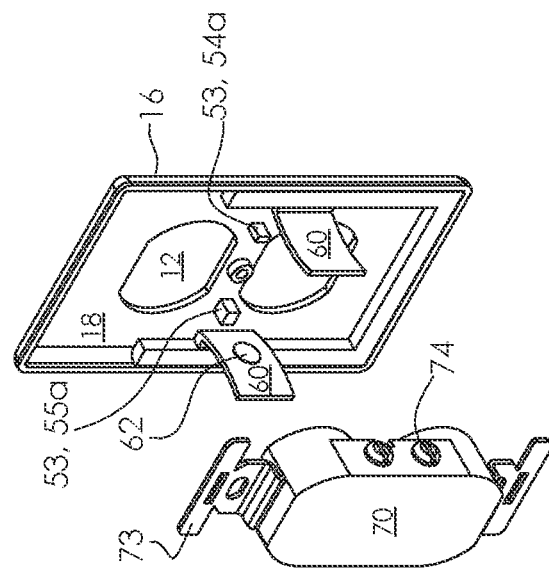
FIG. 10 illustrates a rear perspective view of the wall plate of FIG. 9.

FIG. 10 illustrates a rear exploded perspective view of the wall plate of FIG. 9, opposite the view shown in FIG. 11, showing keying or keyed features 53. The back surface of the face plate 20 is shown comprising a first keyed interface 54a and a third keyed interface 55a, each formed near a midsection of the face plate 20, spaced vertically between the upper opening 12 and the lower opening 12, and horizontally offset from the fastener opening 14 at the center of the wall plate. Both the first keyed interface 54a and a third keyed interface 55a are shown formed as protrusions extending in a direction perpendicular to, and away from, the back surface 18 of the wall plate 20. The first keyed interface 54a and the third keyed interface 55a may be advantageously formed of different shapes, such as one or more of a cube, rectangular prism, cylinder, or other geometric or organic three-dimensional form. The first keyed interface 54a and the third keyed interface 55a may also be of different sizes, and asymmetrically positioned along, or offset from, a central vertical axis and along, or offset from, a central horizontal axis. The first keyed interface 54a and the third keyed interface 55a may also be asymmetrically positioned about the centroid of the receptacle 70, so that upon rotating the wall plate 20, the first keyed interface 54a and the third keyed interface 55a are only compatible with, and mateably couple with, their corresponding second keyed interface 54b and fourth keyed interface 55b.

FIG. 11 illustrates a rear profile view of the face plate 20 from the powered wall plate 10 of FIG. 9, and further shows the first keyed interface 54a and the third keyed interface 55a formed on, disposed, on, or coupled to the back surface 18 of the face plate 20. Similarly, FIG. 12 illustrates a front profile view of the receptacle 70 from the powered wall plate 10 of FIG. 9; and further shows the second keyed interface 54b and the fourth keyed interface 55b formed on, disposed, on, or coupled to the back surface 18 of the face plate 20.

As such, the keying 53 facilitates, accommodates, or can make reasonably sure that the wall plate 10 works with receptacles 70 that are made to receive the wall plate 20 and prevents usage of the keyed wall plate 20 on other receptacles 70 that are not well-suited to receive the wall plate 20 (including the terminal screws 74 being positioned incorrectly or made from materials that do not allow for good electrical contact with contacts 62 formed on the spring-biased terminals 60.

FIGS. 13-18 show that the wall plate 20 cannot be fully or properly assembled with the face plate 20 coupled to the receptacle 70 when the proper and corresponding keying 53 is not present to ensure a good or compatible fit between the face plate 20 and the electrical receptacle 70.

Figure 13:
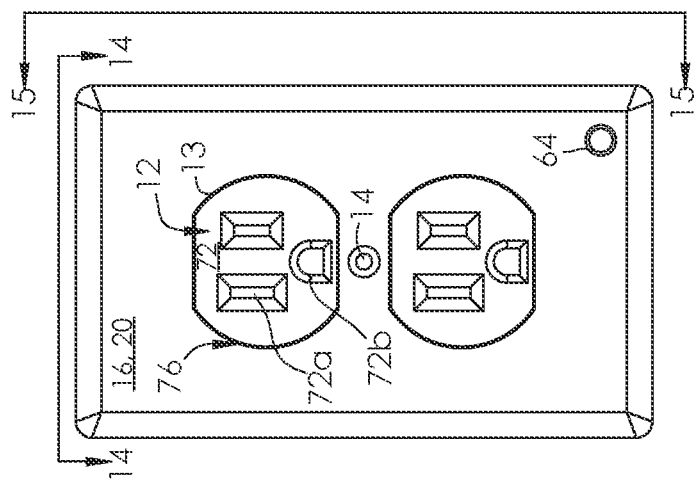
FIG. 13 illustrates a front profile view of a powered wall plate comprising a partially keyed interface.

FIG. 13 shows a front profile view of the powered wall plate 10 coupled to the electrical receptacle 70 with the openings 72, 72a of the electrical receptacle 70 through openings 12 in the wall plate 10 for receiving the prongs or tines of electrical plugs. The view of FIG. 13 presents the wall plate 10 and the receptacle 70 as would be seen from an open space or by a passerby. FIG. 13 also introduces a gap or offset 76 between the face plate 20 and the receptacle 70 that results from the keyed features 53 not being compatible of mateably coupled.

An indicator or indicator light 64 may be visible at surface of the powered wall plate 10, such as at the front surface 16, as shown at the lower right corner of the all plate 10 in FIG. 13. The indicator 64 may be coupled to the circuit board 50 and be activated when the circuitry protection 52 is activated to indicate to a user that the spring-biased terminals 60 are improperly coupled to the receptacle terminals 74. When the indicator 64 comprises an indicator light 64 coupled to the circuit board 50, the light 64 may be configured to be illuminated when the circuitry protection 53 is activated to indicate to a user that the spring-biased terminals 60 are improperly coupled to the receptacle terminals 74, or additionally or alternatively, that the keying 53 is not properly or sufficiently mateably coupled. The keying 53 may be configured to prevent the powered feature 90 from receiving power, being activated, or operating when the keying 53 is not properly engaged.

Figure 14:
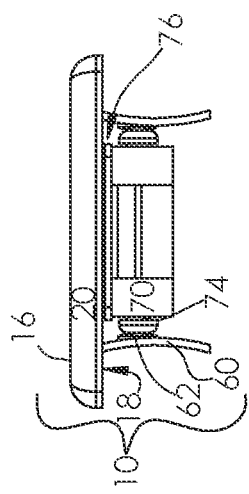
FIG. 14 illustrates a top plan view of the wall plate of FIG. 13.

FIG. 14 shows a top or plan view of the power wall plate 10 taken along the section line 14 shown in FIG. 13. The view of FIG. 14 is perpendicular or orthogonal to the view shown in FIG. 13. The power wall plate 10 is shown with the face plate 20 coupled to the electrical receptacle 70 with the spring-biased terminals 60 of the power wall plate 10 coupled to the screws or terminals 72b of the receptacle 70. FIG. 14 also shows the gap or offset 76 between the face plate 20 and the receptacle 70 that results from the keyed features 53 not being compatible or mateably coupled.

Figure 15:
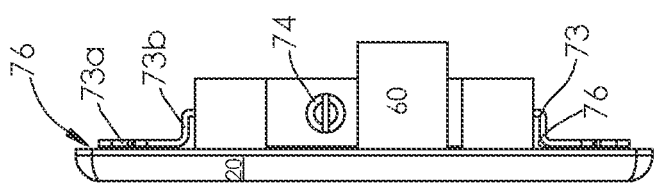
FIG. 15 illustrates a right-side profile view of the wall plate of FIG. 13.

FIG. 15 shows a right side profile view of the power wall plate 10, as taken along the section line 15 in FIG. 13. The power wall plate 10 is further shown with the face late 20 coupled to the electrical receptacle 70 shown in a view orthogonal or perpendicular to that shown in FIGS. 13 and 14. The view of FIG. 15 presents the wall plate 10 with the face plate 20 and the receptacle 70 arranged as would be seen if the wall to which they were mounted did not obscure a view of the receptacle 70 when it was disposed within the wall.

FIG. 15 also shows the gap or offset 76 between the face plate 20 and the receptacle 70 that results from the keyed features 53 not being compatible of mateably coupled. More specifically, FIG. 15 shows the yoke or metal bracket 73 of the receptacle 70 offset from, or with the gap 76 between, the yoke 73 and the rear surface 18 of the wall plate 10 or the face plate 20. Stated another way, FIG. 15 shows the yoke 73 of the receptacle 70 offset from and not flush with, not touching, not in direct contact, or not against or adjacent the rear surface 18 of the wall plate 10 or the face plate 20. FIG. 15 further shows the yoke 73 comprises a vertical portion 73a and horizontal portion 73b, with the vertical portion 73a of yoke 73 visible behind (or in FIG. 15 to the right of) the rear surface 18 of face plate 20, thereby differing to tighter fit shown, e.g., in FIG. 25.

Figure 16:
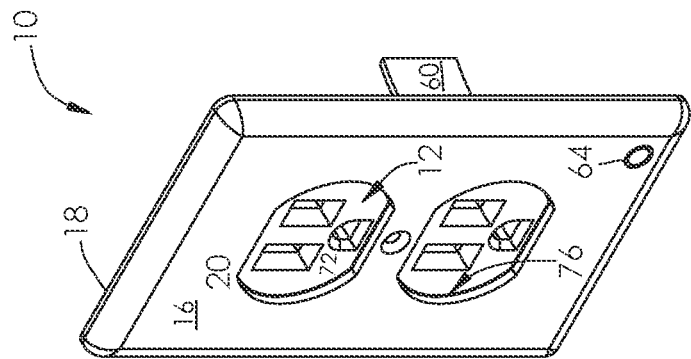
FIG. 16 illustrates a front/side perspective view of the wall plate of FIG. 13.

FIG. 16 shows a front perspective view of the power wall plate 10 comprising the wall plate 20 coupled with the electrical receptacle 70 similar to the views shown in FIGS. 13-15. FIG. 16 also shows the gap or offset 76 between the face plate 20 and the receptacle 70 that results from the keyed features 53 not being compatible or mateably coupled.

Figure 18:
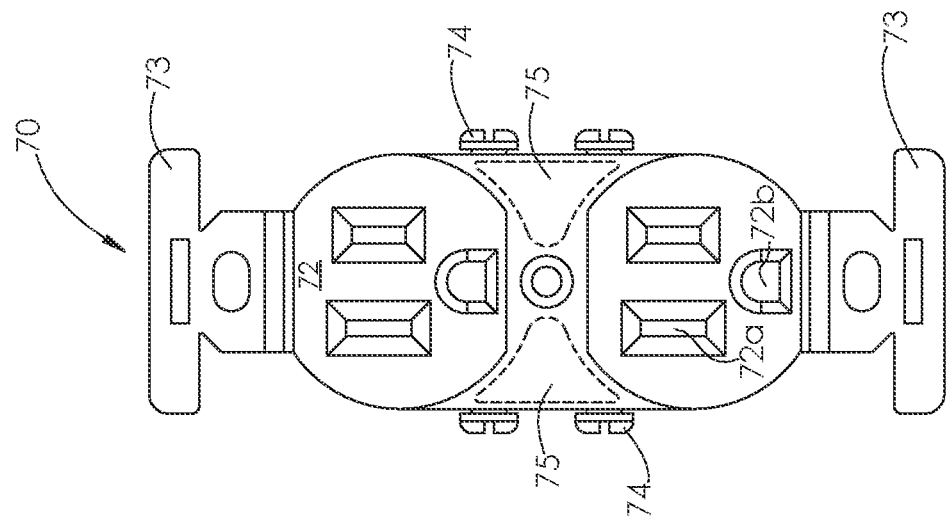
FIG. 18 illustrates a front profile view of the face plate from the wall plate of FIG. 13.
Figure 17:
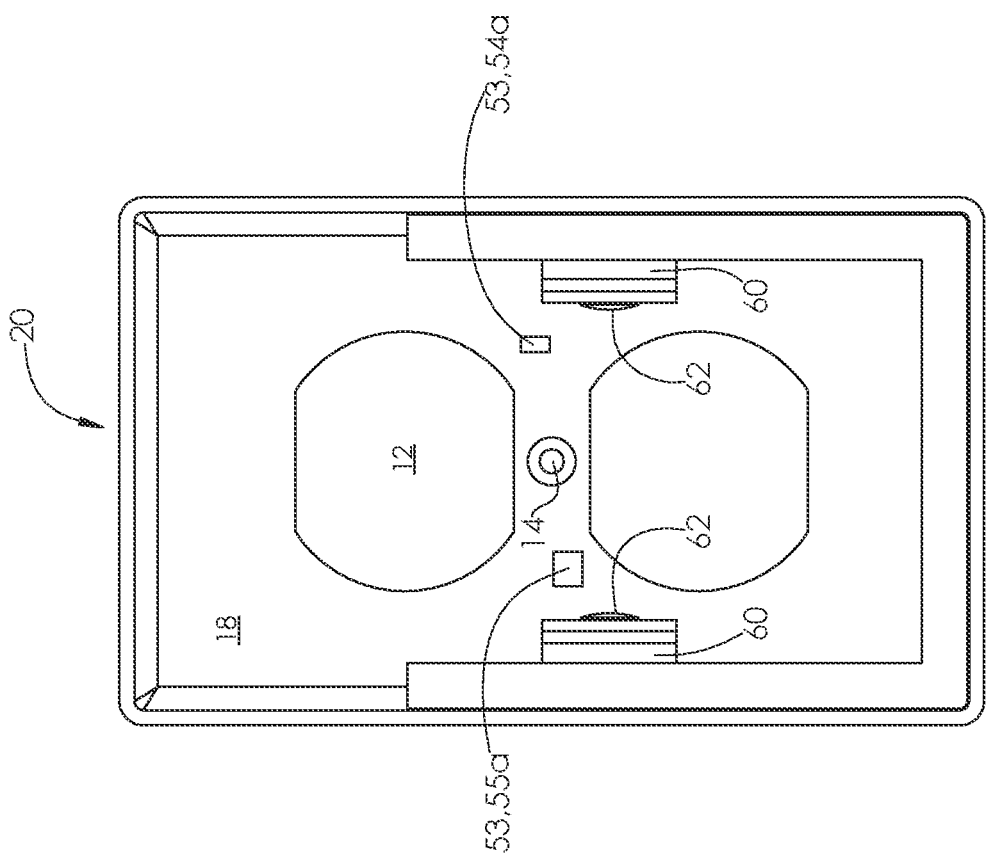
FIG. 17 illustrates a back profile view of the face plate from the wall plate of FIG. 13.

FIGS. 17 and 18 show an instance in which a wall plate 20 with keying 53 formed as protrusion 54a and 55a is incompatible with a conventional or unkeyed receptacle 70. As shown in FIG. 18, the conventional receptacle 70 comprises a blank space 75, such as a flat or planar face, that is not designed, arranged, or configured to receive the protrusion 54a and 55a from the rear surface 18 of the face plate 20, thereby producing the physical space or gap 76.

In other instances, the reverse may be true, and the receptacle 70 may be unconventional or comprise a modified structure comprising keying 53 formed as protrusions—such as with second keyed interface 54b and fourth keyed interface 55b. As such, the protrusions on the receptacle 70—such as on face 72, or side of the receptacle 70, rather than recesses or openings on the receptacle 70 and protrusions on the rear surface 18 of the wall plate 20—may provide the gap or offset 76 when used with conventional face plates 20. Thus, a person of ordinary skill in the art (POSA) will appreciate that protrusion/recess configurations of keying elements 53 may be reversed or interchanged.

FIGS. 19-26 illustrate various views of the powered wall plate 10 comprising keyed features 53 for improved connection and function between face plate 20 and receptacle 70. The keyed wall plate 10 of FIGS. 19-26 may be similar or identical to the keyed wall plate of FIGS. 9-12, differing only in showing the face plate 20 and the receptacle 70 coupled together with keying features 53, rather than showing the face plate 20 and the receptacle 70 separated.

Figure 19:
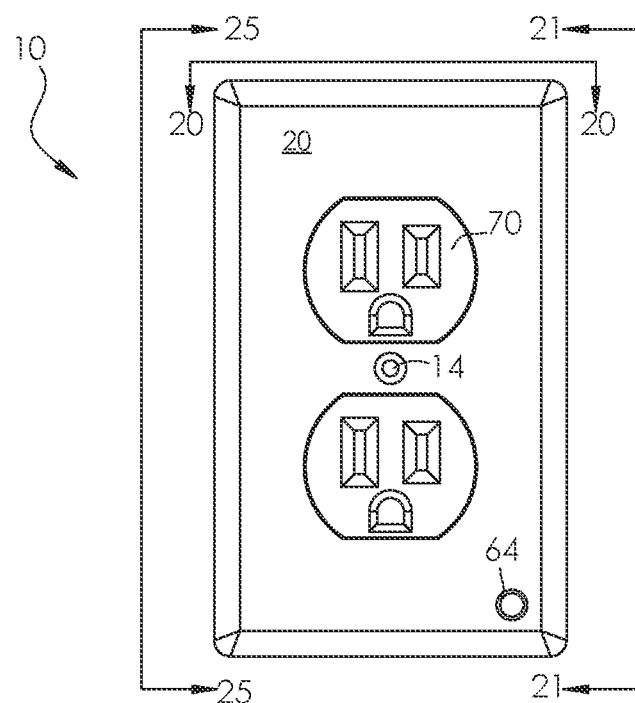
FIG. 19 illustrates a front profile view of a powered wall plate 10.
Figure 20:
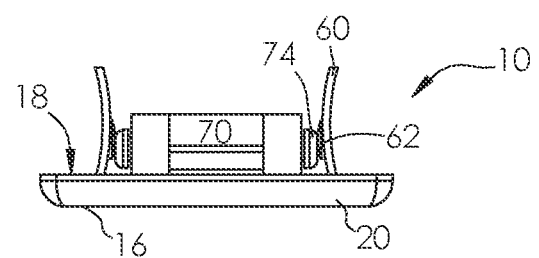
FIG. 20 shows a top plan view of the powered wall plate 10 from FIG. 19.
Figure 21:
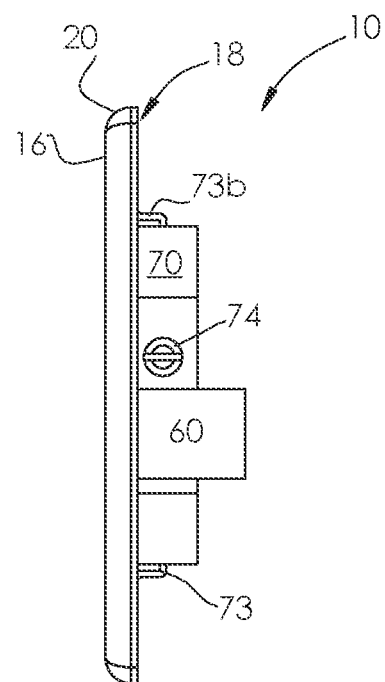
FIG. 21 shows a right side profile view of the powered wall plate 10 from FIG. 19.
Figure 22:
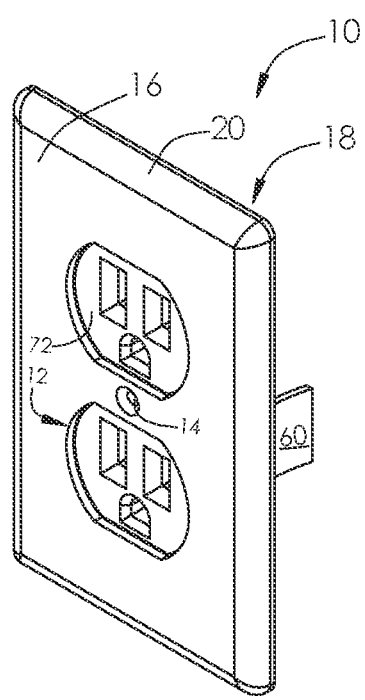
FIG. 22 shows a perspective view of the powered wall plate 10 from FIG. 19.
Figure 23:
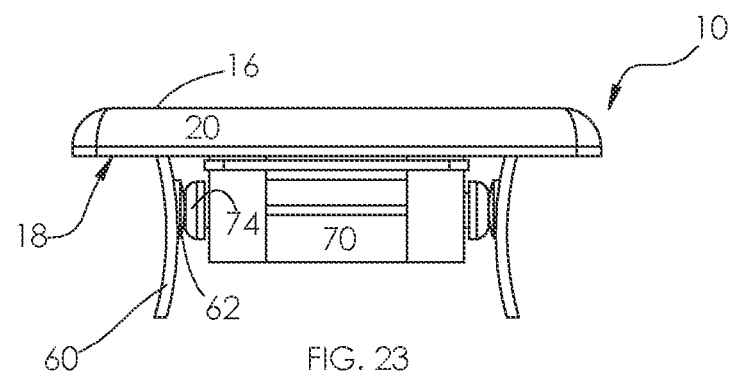
FIG. 23 shows a bottom plan view of the powered wall plate 10, from FIG. 19.
Figure 24:
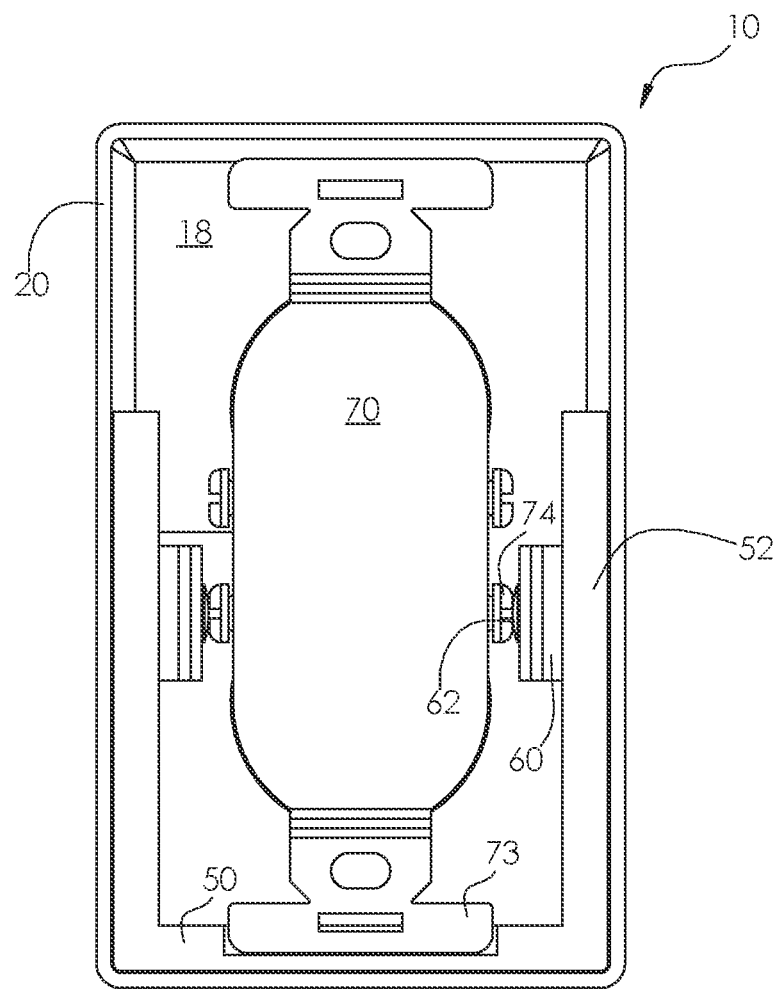
FIG. 24 shows a rear profile view of the powered wall plate from FIG. 19.
Figure 25:
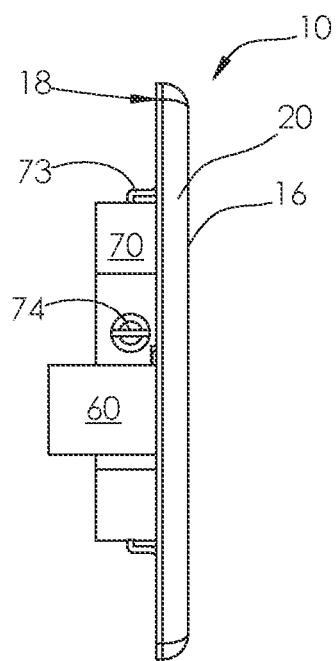
FIG. 25 shows a left side profile view of the powered wall plate 10 from FIG. 19.
Figure 26:
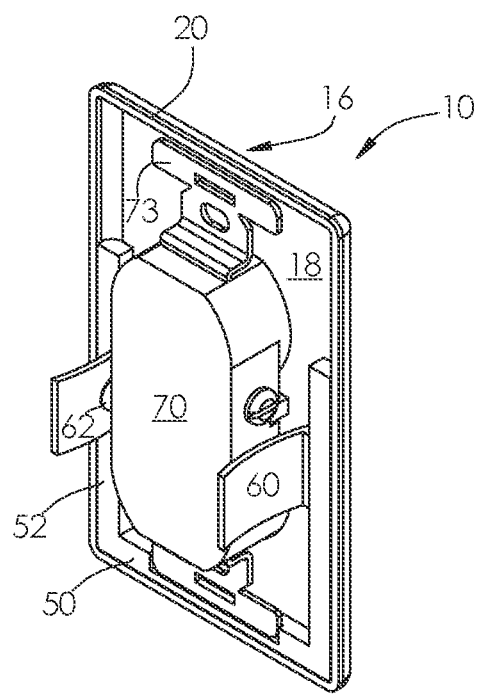
FIG. 26 shows a perspective view of the powered wall plate 10 from FIG. 19.

FIG. 19 shows a front profile view of the powered wall plate 10. FIG. 20 shows atop plan view of the powered wall plate 10 taken along the section line 20 shown in FIG. 19. FIG. 21 shows a right side profile view of the powered wall plate 10 taken along the section line 21 shown in FIG. 19. FIG. 22 shows a perspective view of the front right portion of the powered wall plate 10 from FIG. 19. FIG. 23 shows a bottom plan view of the powered wall plate 10, opposite the view shown in FIG. 20. FIG. 24 shows a rear profile view of the powered wall plate 10 with the spring-biased terminals 60 of the face plate 20 coupled to the terminal screws 74 of the receptacle 20. FIG. 25 shows a left side profile view of the powered wall plate 10, opposite the view shown in FIG. 21, and taken along the section line 25 shown in FIG. 19. FIG. 26 shows a perspective view of the rear left portion of the powered wall plate 10 from FIG. 19. Taken together, or separately, FIGS. 19-26 show keying 53, whether mechanical, electric, magnetic or otherwise, to ensure a good fit between the face plate 20 and the electrical receptacle 70, and to provide circuitry protection 52 by preventing a flow of electricity through the spring-biased terminals 60 to power powered features 90 when the keyed features 53 are not mateably coupled, providing a good fit between contacts 62 of the spring-biased terminals 60 and terminals 74 of the receptacle 70.

Figure 27:
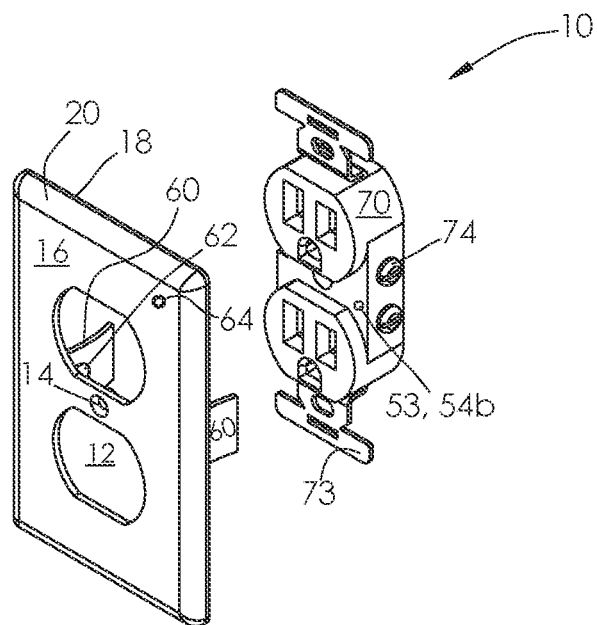
FIG. 27 illustrates a front perspective view of a powered wall plate 10.

FIGS. 27 and 28 illustrate examples of keying 53 that is magnetic or electrical rather than mechanical. More specifically, FIG. 27 shows the electrical or magnetic coupling feature or keying 54b of the receptacle 70. FIG. 28 shows the electrical or magnetic coupling feature 54a of the wall plate 20, for coupling with the coupling feature 54b of the electrical receptacle 70.

The electrical or magnetic coupling feature or keying 54b can be a magnet, and electrical or magnetic coupling feature or keying 54a can be a switch that responds to the magnet when in proximity. In proximity the switch 54a would close and allow the wall plate 10, or powered features 90 thereof, to turn on. When not in proximity of the magnet 54b, the switch 54a would open and not allow the wall plate 10, or the powered feature 90 thereof, to turn on. If the wall plate 10 were installed to a receptacle 70 absent the magnet 54b, the wall plate 10, or powered feature 90 thereof, would will not turn on, although in some instances the indicator 64 may be activated to indicate that the keying features 54a and 54 are not properly or mateably coupled.

The electrical or magnetic coupling feature or keying 54b could be a boss and electrical or magnetic coupling feature or keying 54a can be a switch. When the wall plate 10 is installed onto a receptacle 70 that switch 54a", the switch will close and allow the wall plate 10, or powered elements 90 thereof, to turn on. When the wall plate 10 in installed onto a receptacle 70 that does not include the switch 54b, the wall plate 10 will not turn on, although in some instances the indicator 64 may be activated to indicate that the keying features 54a and 54 are not properly or mateably coupled.

When magnetic keying 53 is used, the magnet could be any type of magnet or magnetic material, such as a rare-earth magnet, a ferrous material, or other type of magnetized material. The magnet or magnetic keying 53 could also be an electro-magnet that is powered internally within the wall plate 10, including within the receptacle 70. A POSA will understand that the relative positions or descriptions of the keying 54a and 54b could also be reversed.

The keying 53 shown and described herein is not limited to the geometry shown in the figures, which is for illustrative purposes only, and given by way of example. The keying 53 may be tabs, bosses, or any suitable device or structure of any cross sectional shape or length, including rectangular, square, rounded, spherical, cubic, polygonal, irregular, star, triangle, or any other geometric or organic shape or form. There could be one or more keyed features 53 or one or more keyed pairs 54c, 55c. The keying 53 may also occur on sides of the faces 72 or receptacles 70. Keying 53 is not limited to duplex outlets, and may be applied to single outlets, triple outlet devices, or devices with any number of outlets, as well as on decorators, GFCI, AFCI devices, as well as with light switches, dimmers, or any other suitable or similar connection with an outlet, wall plate, or other similar or suitable connection.

Further, the keying 53 shown can prevent the face plate 20 from being rotated or turned upside down relative to the receptacle 70 when being installed. As such, the figures (for illustrative purposes only) show that the keyed features 53 on opposing sides of the powered wall plate 10 as being different, such that the keyed features 53 only allow the wall plate 10 to be installed in one orientation to ensure good electrical contact between the spring-biased terminals 60 and the terminal screws 74.

FIGS. 29A-29C illustrate various powered wall plates 10 comprising keyed interfaces 53. FIG. 29A illustrates a perspective view of a powered wall plate 10 comprising powered features 90 comprising USB ports 92, and a carbon monoxide detector or smoke alarm 95. FIG. 29B illustrates a perspective view of a powered wall plate 10 comprising a powered feature 90 comprising a USB port 92. FIG. 29C illustrates a front perspective view of a powered wall plate 10 in which the electrical receptacle 70 is a light switch, which may be one or more of a toggle light switch, dimmer, turn dial, plunger, flip switch, touch pad, remote wirelessly controlled interface, or any other suitable switch. In some instances, the electrical receptacle 70 may comprise at least one light switch, at least one electrical outlet, or both, as well as any other suitable arrangement of known electrical devices. The powered wall plate 10 is further shown comprising powered features 90 comprising camera 94, which includes a camera lens 94a and a camera swivel 94b.

Figure 30:
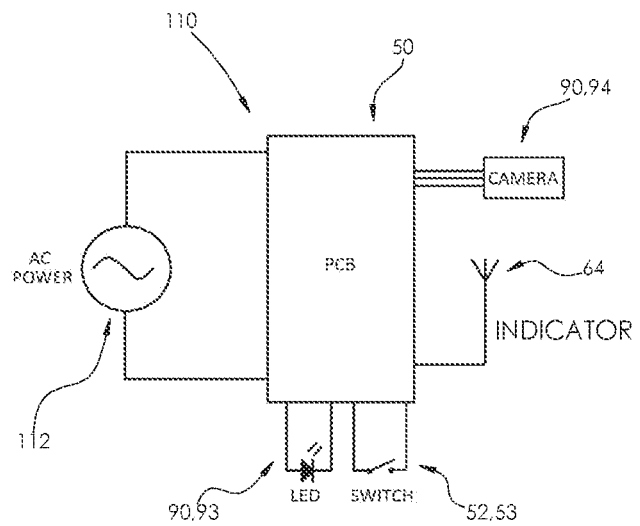
FIG. 30 illustrates a schematic view of an embodiment of an electrical circuit operably corresponding to an embodiment of a powered wall plate.

FIG. 30 illustrates a schematic view of an embodiment of an electrical circuit 110 operably corresponding to an embodiment of the powered wall plates 10. The printed circuit board 50 is electrically connected to powered features 90, such as camera 90, indicator 64, switch 52 or keyed features 53, LED 93, and AC electrical power 112. As shown schematically, the powered features 90 are electrically powered by electricity, such as AC power 112, obtained through electrical connection of the electrical receptacle 70, such as through spring-biased terminals 60 contacting terminal screws 74. When an improper connection is made between spring-biased terminals 60 and contact terminal screws 74, the circuitry protection 52, keyed features 53, or switch can be activated to prevent power from being sent through spring-biased terminals 60 and to powered features 90, so as to prevent a fire, or other damage from occurring.

It will be understood that implementations of the powered wall plate 10 comprising safety circuits or circuitry protection 52 include, but are not limited to, the specific components disclosed herein, as virtually any components consistent with the intended operation of various powered wall plate attachments may be utilized. Accordingly, for example, it should be understood that, while the drawings and accompanying text show and describe particular powered wall plate attachment implementations, any such implementation may comprise any shape, size, style, type, model, version, class, grade, measurement, concentration, material, weight, quantity, and/or the like consistent with the intended operation of powered wall plate attachments.

The concepts disclosed herein are not limited to the specific powered wall plate attachments shown herein. For example, it is specifically contemplated that the components included in particular powered wall plate attachments may be formed of any of many different types of materials or combinations that can readily be formed into shaped objects and that are consistent with the intended operation of the powered wall plate attachment. For example, the components may be formed of: rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials; plastics and/or other like materials; composites and/or other like materials; metals, such as zinc, magnesium, titanium, copper, iron, steel, carbon steel, alloy steel, tool steel, stainless steel, spring steel, aluminum, and/or other like materials; and/or any combination of the foregoing.

Furthermore, powered wall plate attachments may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular powered wall plate attachment implementations, it should be readily apparent that a number of modifications may be made without departing from the spirit thereof and that these implementations may be applied to other implementations disclosed or undisclosed. The presently disclosed powered wall plate attachments are, therefore, to be considered in all respects as illustrative and not restrictive.

What is claimed is:

1. A powered wall plate, comprising:
    a face plate configured for mounting on an electrical receptacle, the face plate comprising an opening extending through the face plate configured to expose the electrical receptacle when the face plate is mounted on the electrical receptacle;
    a first keyed interface extending rearward of a rear surface of the face plate and configured to mateably couple with at least a second keyed interface on a face of an electrical receptacle;
    spring-biased terminals coupled to and extending rearward of a rear surface of the face plate and disposed at opposing sides of the opening, wherein the spring-biased terminals are configured to couple to terminal screws disposed on opposing sides of the electrical receptacle;
    a printed circuit board (PCB) coupled to the face plate and the spring-biased terminals; and
    wherein the powered wall plate is configured to supply power to a powered feature of the powered wall plate through the spring-biased terminals, the powered feature coupled to the PCB, wherein the powered wall plate is configured to receive electrical power from the spring-biased terminals only when the first keyed interface is mateably coupled with the second keyed interface.

2. The power wall plate of claim 1, further comprising the electrical receptacle.

3. The powered wall plate of claim 1, wherein the first keyed interface and the second keyed interface are mechanically and electrically coupled to each other to provide a desired connection between the first and second spring-biased terminals and the first and second to terminal screws, respectively.

4. The powered wall plate of claim 1, wherein the powered feature comprises at least one of: a USB port, a night light, a camera, or a carbon monoxide detector or smoke alarm.

5. The powered wall plate of claim 1, further comprising a warning indicator configured to indicate a safe connection from the mated coupling of the first keyed interface and the second keyed interface.

6. The powered wall plate of claim 1, further comprising an indicator light coupled to the circuit board and visible at the front surface of the face plate, the indicator light configured to be illuminated when the first keyed interface and the second keyed interface are not mateably coupled to indicate to a user that the spring-biased terminals are improperly coupled to the terminal screws.

7. A powered wall plate, comprising:
    a face plate configured for mounting on an electrical receptacle, the face plate comprising an opening extending through the face plate;

a first keyed interface extending rearward of a rear surface of the face plate and configured to mateably couple with at least a second keyed interface on a face of the electrical receptacle;

spring-biased terminals coupled to and extending rearward of the face plate, and configured to couple to electrical terminals disposed on sides of the electrical receptacle; and wherein the powered wall plate is configured to supply power to a powered feature of the powered wall plate through the spring-biased terminals only when the first keyed interface is mateably coupled with the second keyed interface.

8. The power wall plate of claim 7, further comprising the electrical receptacle.

9. The powered wall plate of claim 7, wherein the first keyed interface and the second keyed are mechanically coupled, electrically coupled, or both, to each other to provide power to the powered feature.

10. The powered wall plate of claim 7, wherein one of the first keyed interface and the second keyed interface is a boss or a magnet and the other of the first keyed interface and the second keyed interface is a switch.

11. The powered wall plate of claim 7, wherein the powered feature comprises at least one of: a USB port, a night light, a camera, or a carbon monoxide detector or smoke alarm.

12. The powered wall plate of claim 7, further comprising an indicator visible at the front surface of the face plate, the indicator configured to indicate to a user when the first keyed interface and the second keyed interface are not mateably coupled and the spring-biased terminals are improperly coupled to the terminals.

13. A powered wall plate, comprising:
a face plate configured for mounting on an electrical receptacle, the face plate comprising an opening, and at least a first keyed interface configured to couple with at least a second keyed interface on an electrical receptacle;
biased terminals coupled to the face plate and configured to couple to electrical terminals of the electrical receptacle; and
wherein the powered wall plate is configured to supply power to a powered feature of the powered wall plate through the biased terminals only when the first keyed interface is mateably coupled with the second keyed interface.

14. The powered wall plate of claim 13, wherein the powered feature is configured to be in electrical communication with the biased terminals only when the first keyed interface and the second keyed interface are mateably coupled.

15. The powered wall plate of claim 13, further comprising the electrical receptacle.

16. The powered wall plate of claim 13, wherein the first keyed interface is configured to mateably couple with the second keyed interface mechanically, electrically, or both, to provide power from the receptacle to the powered feature.

17. The powered wall plate of claim 13, wherein one of the first keyed interface and the second keyed interface is a boss or a magnet and the other of the first keyed interface and the second keyed interface is a switch.

18. The powered wall plate of claim 13, wherein:
the first keyed interface and the second keyed interface comprise a tab and a recess that together form a first keyed pair, and
the powered wall plate further comprises a second keyed pair comprising a tab and a recess, the second keyed pair comprising a structure different from a structure of the first keyed pair such that the first keyed pair and the second keyed pair are not compatible.

19. The powered wall plate of claim 13, wherein the powered feature comprises at least one of: a USB port, a night light, a camera, or a carbon monoxide detector or smoke alarm.

20. The powered wall plate of claim 13, further comprising an indicator visible at a surface of the face plate, the indicator configured to indicate to a user when the first keyed interface and the second keyed interface are not mateably coupled and the spring-biased terminals are improperly coupled to the terminals.

* * * * *

UNITED STATES PATENT AND TRADEMARK OFFICE
CERTIFICATE OF CORRECTION

PATENT NO. : 11,646,523 B1  
APPLICATION NO. : 17/976572  
DATED : May 9, 2023  
INVENTOR(S) : Jeffrey P. Baldwin et al.

Page 1 of 1

It is certified that error appears in the above-identified patent and that said Letters Patent is hereby corrected as shown below:

In the Claims

Claim 9, Column 17, Line 17, 'The powered wall plate of claim 7, wherein the first keyed interface and the second keyed are mechanically' should read --The powered wall plate of claim 7, wherein the first keyed interface and the second keyed interface are mechanically--.

Signed and Sealed this
Twenty-second Day of August, 2023

Katherine Kelly Vidal
*Director of the United States Patent and Trademark Office*